(12) United States Patent
Sakurai et al.

(10) Patent No.: US 8,289,645 B2
(45) Date of Patent: Oct. 16, 2012

(54) MAGNETIC DISK APPARATUS

(75) Inventors: Masatoshi Sakurai, Tokyo (JP); Akira Kikitsu, Yokohama (JP); Kazuto Kashiwagi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 67 days.

(21) Appl. No.: 12/897,281

(22) Filed: Oct. 4, 2010

(65) Prior Publication Data

US 2011/0019306 A1    Jan. 27, 2011

Related U.S. Application Data

(63) Continuation of application No. 11/819,639, filed on Jun. 28, 2007.

(30) Foreign Application Priority Data

Jun. 30, 2006   (JP) .................................. 2006-182737

(51) Int. Cl.
  *G11B 21/02*   (2006.01)
(52) U.S. Cl. ................. 360/75; 360/48; 360/51; 360/76
(58) Field of Classification Search ........................ None
  See application file for complete search history.

(56) References Cited

U.S. PATENT DOCUMENTS

| | | | |
|---|---|---|---|
| 3,554,798 A * | 1/1971 | Nacci | 360/134 |
| 5,677,819 A | 10/1997 | Seko et al. | |
| 6,021,024 A * | 2/2000 | Akiyama et al. | 360/236.8 |
| 6,937,421 B2 * | 8/2005 | Rubin et al. | 360/77.01 |
| 6,977,108 B2 * | 12/2005 | Hieda et al. | 428/64.2 |
| 7,009,791 B2 * | 3/2006 | Shimatani | 360/29 |
| 7,236,324 B2 * | 6/2007 | Albrecht et al. | 360/75 |
| 7,317,596 B2 * | 1/2008 | Albrecht et al. | 360/319 |
| 7,782,561 B2 * | 8/2010 | Albrecht et al. | 360/48 |
| 7,864,470 B2 * | 1/2011 | Gao et al. | 360/51 |
| 2004/0137150 A1 | 7/2004 | Saito et al. | |
| 2006/0061900 A1 * | 3/2006 | Ohtsuka et al. | 360/69 |
| 2006/0139814 A1 * | 6/2006 | Wachenschwanz et al. | 360/317 |

FOREIGN PATENT DOCUMENTS

| | | |
|---|---|---|
| JP | 06-259757 | 9/1994 |
| JP | 2002-279616 | 9/2002 |
| JP | 2006-073137 | 3/2006 |
| WO | WO 2003/019540 | 3/2003 |

* cited by examiner

*Primary Examiner* — Dismery Mercedes
(74) *Attorney, Agent, or Firm* — Pillsbury Winthrop Shaw Pittman, LLP

(57) ABSTRACT

According to one embodiment, there is provided a magnetic disk apparatus having a magnetic disk having magnetic dot lines each including magnetic dots arrayed at equal intervals in a down track direction, and a read/write head which uses a plurality of adjacent magnetic dot lines as one track and sequentially performs read and write on the magnetic dots included in the magnetic dot lines constituting the track, in which the magnetic dots included in each of the magnetic dot lines in each track of the magnetic disk are displaced in the down track direction from the magnetic dots included in the adjacent dot line in the track depending on a possible skew angle between the read/write head and the track so that the magnetic dots are sequentially accessed by the read/write head.

2 Claims, 4 Drawing Sheets

MAGNETIC DISK APPARATUS

CROSS-REFERENCE TO RELATED APPLICATIONS

This application is a continuation of co-pending U.S. application Ser. No. 11/819,639, filed Jun. 28, 2007, and for which priority is claimed under 35 U.S.C. §120. This application is based upon and claims the benefit of priority under 35 U.S.C. §119 from Japanese Patent Application No. 2006-182737, filed Jun. 30, 2006, the entire contents of both applications are incorporated herein by reference in their entireties.

BACKGROUND

1. Field

One embodiment of the present invention relates to a magnetic disk apparatus, and in particular, to a magnetic disk apparatus using a bit patterned medium.

2. Description of the Related Art

In current magnetic disk apparatuses (hard disk drives), bits are written to a recording layer with a magnetic head. For magnetic disks in these magnetic disk apparatuses, problems such as the interference between adjacent tracks and thermal fluctuation resistance have become serious.

Proposals have been made of bit patterned media in which a magnetic material is processed into arrayed magnetic dots separated from one another each of which is used as one bit. Such bit patterned media are expected to solve the problems such as the interference between adjacent tracks and thermal fluctuation resistance.

In current magnetic disks, one bit written by a magnetic head has an aspect ratio of about 4 to 7 and is longer in the cross track direction than in the down track direction. In such a bit pattern, if a bit aspect ratio is 4, a bit pitch is 25 nm, and the ratio of the bit length to the length of a non-recording area in the down track direction is 2:1, the interval between the bits is about 8 nm.

However, when an attempt is made to manufacture bit patterned media having a bit pattern equivalent to that of the current magnetic disks, forming magnetic dots of a high aspect ratio is very difficult and is impractical.

Thus, a proposal has been made of a bit patterned medium in which a self-assembling material is used to arrange magnetic dots in the down track direction to form magnetic dot lines so that magnetic dots in each magnetic dot line are displaced from those in the adjacent magnetic dot line by a ½ pitch. In addition, a proposal has been made that read and write be sequentially performed on magnetic dots included in a plurality of dot lines used as one track (Jpn. Pat. Appln. KOKAI Publication No. 2002-279616).

This bit patterned medium enables read and write similarly to the current magnetic disks. This eliminates the need to form magnetic dots of a high aspect ratio and provides a sufficient interval between the magnetic dots.

However, in this bit patterned medium, the amount by which the magnetic dots included in each magnetic dot line are displaced from those included in the adjacent magnetic dot line is fixed to a ½ pitch. Thus, the bit patterned medium disadvantageously cannot deal with a skew angle that may occur when the head accesses the inner or outer peripheral side of the magnetic disk.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the present invention, there is provided a magnetic disk apparatus comprising: a magnetic disk comprising magnetic dot lines each including magnetic dots arrayed at equal intervals in a down track direction; and a read/write head which uses a plurality of adjacent magnetic dot lines as one track and sequentially performs read and write on the magnetic dots included in the magnetic dot lines constituting the track, wherein the magnetic dots included in each of the magnetic dot lines in each track of the magnetic disk are displaced in the down track direction from the magnetic dots included in the adjacent dot line in the track depending on a possible skew angle between the read/write head and the track so that the magnetic dots are sequentially accessed by the read/write head.

Figure 1:
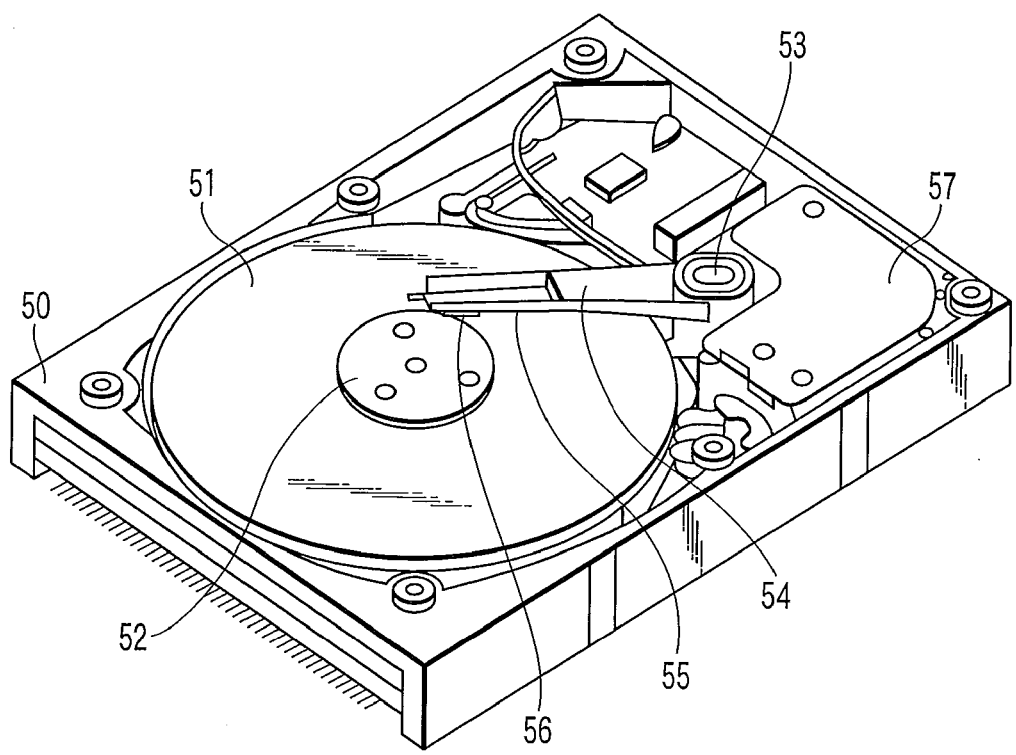
FIG. 1 is a perspective view of a magnetic disk apparatus (hard disk drive) according to an embodiment of the present invention.

FIG. 1 is a perspective view of a magnetic disk apparatus (hard disk drive) according to an embodiment of the present invention. This magnetic recording/reproduction apparatus comprises a chassis 50, a magnetic disk 51, a head slider 56 including a magnetic head, a head suspension assembly (a suspension 55 and an actuator arm 54) supporting the head slider 56, a voice coil motor (VCM) 57, and a circuit board.

The magnetic disk (bit patterned medium) 51 is fitted on the spindle motor 52 and rotated so that various digital data can be recorded in the magnetic disk according to a perpendicular magnetic recording system. The magnetic head incorporated in the head slider 56 is of what is a so-called integrated type and includes a write head with a single-pole structure and a read head using a shield MR reproducing element (a GMR film, a TMR film, or the like). The suspension 55 is held at one end of the actuator arm 54 to support the head slider 56 opposite the recording surface of the magnetic disk 51. The actuator arm 54 is attached to the pivot 53. The voice coil motor (VCM) 57 is provided at the other end of the actuator arm 54. The voice coil motor (VCM) 57 drives the head suspension assembly to locate the magnetic head at any radial position on the magnetic disk 51. The circuit board comprises a head IC to generate, for example, driving signals for the voice coil motor (VCM) and control signals for controlling read and write operations performed by the magnetic head.

Figure 2A:
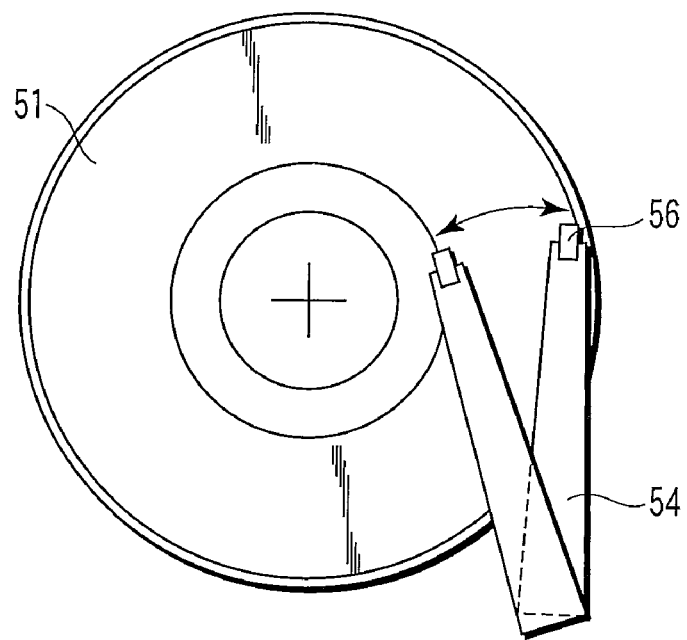
FIGS. 2A and 2B are diagrams showing a skew angle in the magnetic disk apparatus in FIG. 1.
Figure 2B:
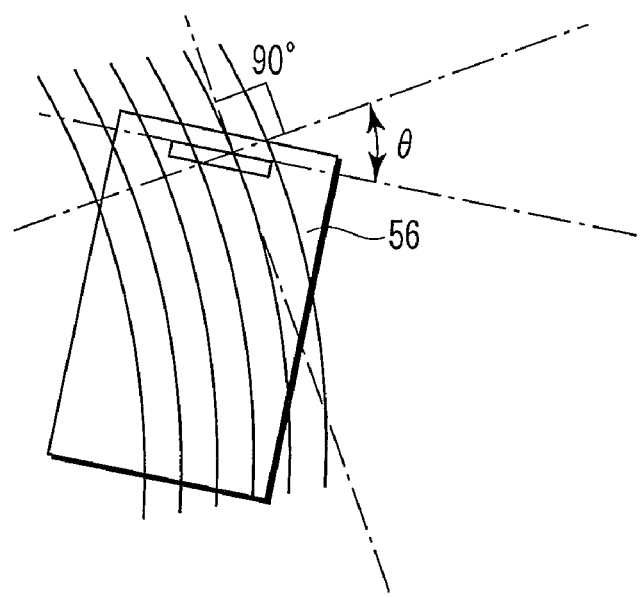

A possible skew angle in the magnetic disk apparatus in FIG. 1 will be described with reference to FIGS. 2A and 2B. FIG. 2A is a plan view showing the positional relationship between the magnetic disk 51 and actuator arm 54 and head slider 56 in the magnetic disk apparatus in FIG. 1. The actuator arm 54 is driven by the voice coil motor to move in a radial direction of the magnetic disk 51 so as to draw a circular arc over the disk. As shown in FIG. 2B, for example, when the head slider 56 is moved to above the outer periphery of the magnetic disk 51, the head slider 56 is located angularly to recording tracks. In this case, the skew angle θ is defined as an angle formed between the direction of the longer side of the read head (that is parallel to the surface of the GMR film, the TMR film, or the like) and the cross track direction.

Figure 3:
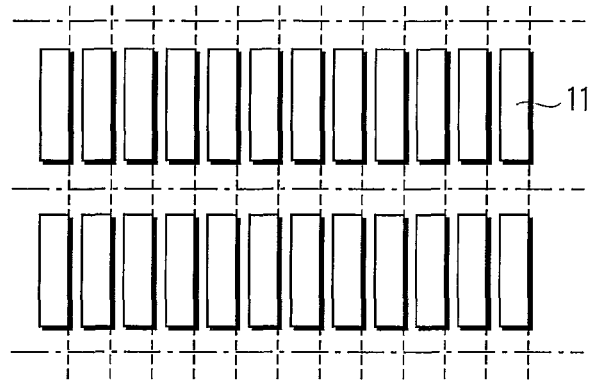
FIG. 3 is a diagram schematically showing the shape of bits recorded in a current magnetic disk.

FIG. 3 schematically shows the shape of bits recorded in current magnetic disks. FIG. 3 shows two lines of bit patterns in which bits 11 included in each line are recorded at a bit aspect ratio of 4 and a bit pitch of 25 nm. In this case, if the ratio of the bit 11 to the non-recording area in the down track direction is set at 2:1, the interval between the adjacent bits 11 becomes about 8 nm. It is difficult to process a magnetic layer to form bits in a form similar to that described above, which constitute magnetic dots.

Figure 4A:
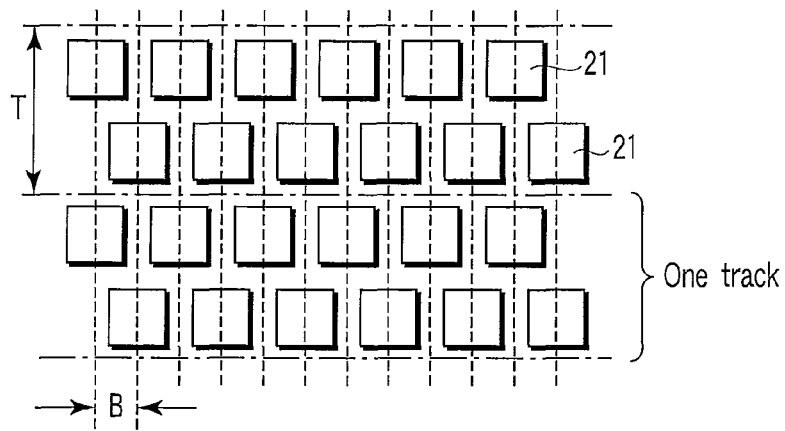
FIGS. 4A and 4B are plan views showing magnetic dots formed in a magnetic disk according to the embodiment of the present invention.
Figure 4B:
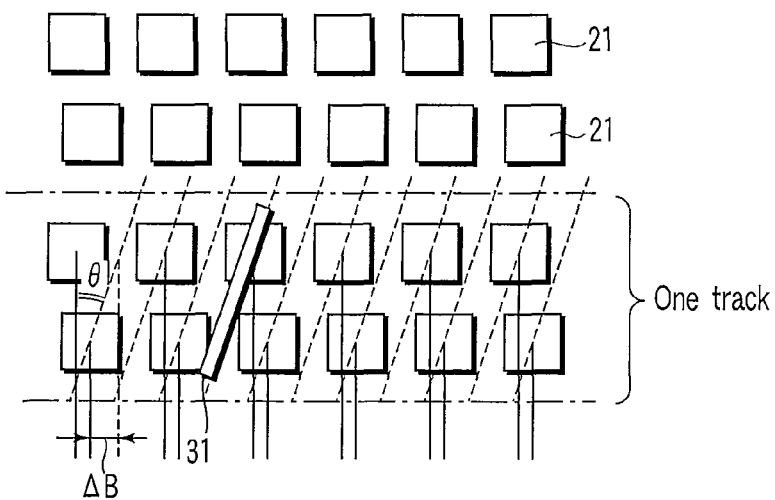

FIGS. 4A and 4B are plan views showing magnetic dots 21 formed in the magnetic disk according to the embodiment of the present invention. In this magnetic disk, two magnetic dot lines (N=2) are used as one track. FIG. 4A shows magnetic dots in an area with a skew angle of zero. FIG. 4B shows magnetic dots in an area with a skew angle θ.

As shown in FIG. 4A, a track pitch is defined as T, and a bit pitch obtained when the skew angle is zero is defined as B. Magnetic dots 21 included in each magnetic dot line are arranged at a pitch NB. In this case, if the bit pitch is set at 25 nm and the ratio of a magnetic material to a nonmagnetic material in the down track direction is set at 2:1 as in the case of the current magnetic disks, the interval between the magnetic dots 21 can be made N times as large as that in the prior art. That is, for N=2, the interval can be doubled to 16 nm.

In the magnetic disk according to the embodiment of the present invention, in an area in which the head 31 has the skew angle θ, the amount by which the magnetic dots 21 included in each of the magnetic dot lines in each track are displaced from those included in the adjacent magnetic dot line in that track is adjusted depending on the skew angle θ as shown in FIG. 4B. Specifically, the magnetic dots included in the n-th (n is an integer from 0 to N−1) magnetic dot line in each track are displaced in the down track direction from those included in the 0-th magnetic dot line in that track by a displacement ΔB represented by the following formula:

$$\Delta B = B - (Tn/N)\tan \theta.$$

When the amount by which the magnetic dots 21 included in each of the magnetic dot lines in each track are thus displaced from those included in the adjacent magnetic dot line in that track is adjusted depending on the skew angle θ, the magnetic dots 21 included in the two magnetic dot lines are alternately and sequentially accessed by the head 31 as shown in FIG. 4B. This enables an operation equivalent t achievement of a high bit aspect ratio during read and write performed on each track.

Figure 5:
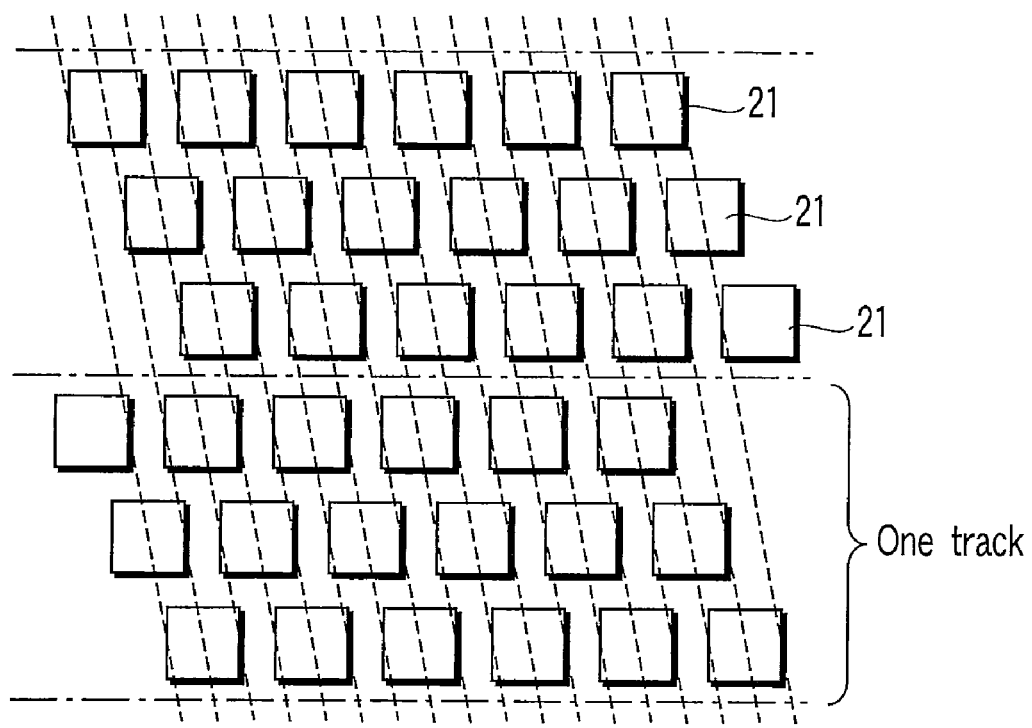
FIG. 5 is a plan view showing magnetic dots formed in a magnetic disk according to another embodiment of the present invention.

FIG. 5 is a plan view showing the magnetic dots 21 formed on a magnetic disk according to another embodiment of the present invention. In this magnetic disk, three magnetic dot lines (N=3) are used as one track. Also in this example, the amount by which the magnetic dots 21 included in each of the magnetic dot lines in each track are displaced from those included in the adjacent magnetic dot line in that track is adjusted depending on the skew angle θ.

In both FIGS. 4 and 5, the interval between the magnetic dot lines in each track is preferably shorter than that between the adjacent tracks.

Now, a brief description will be given of a process of manufacturing a magnetic disk according to the embodiment of the present invention. The process of manufacturing a magnetic disk comprises a transfer step, a magnetic material processing step, and a finishing step. The description will start with the manufacture of a stamper used as a template for patterns used in the transfer step.

The step of manufacturing a stamper is divided into pattern drawing, development, electroforming, and finishing. In pattern drawing, a resist is applied to a master. A master-rotating electron-beam exposure apparatus is used to direct-write areas of the magnetic disk where a nonmagnetic material is to be formed from the inner circumference to outer circumference. The disk is subjected to development and then to a process such as reactive ion etching (RIE) to form a master having the resist with patterns of recesses and protrusions. A Ni thin film is deposited on the master to make the disk conductive. The Ni film is electroformed and then released. Finally, the master is punched at portions corresponding to an inner diameter and an outer diameter. A Ni stamper is thus formed. The stamper has protrusions corresponding to areas of the magnetic disk where a nonmagnetic material is to be formed. The stamper is used to manufacture a bit patterned medium.

In the transfer step, a double-side simultaneous transferring imprint apparatus is used to transfer patterns of the stamper by imprint lithography. Specifically, spin-on-glass (SOG) is applied to both surfaces of the perpendicular recording disk. The disk is chucked at its central hole and sandwiched between two stampers provided for the rear and front surface, respectively, of the disk. The entire surface of the disk is uniformly pressed to transfer the recesses and projections of the stampers to the resist surface. The transfer step provides the resist with the recesses corresponding to the areas of the magnetic disk where the nonmagnetic material is to be formed.

In the magnetic material processing step, resist residues remaining in the recesses of the resist are removed to expose the surface of the magnetic material in the areas where the nonmagnetic material is to be formed. In this stage, the protrusions made of $SiO_2$ are formed on the areas where the magnetic layer is to be left. Then, ion milling is performed using the protrusions of $SiO_2$ as a mask to remove the magnetic layer exposed from the recesses between the protrusions of $SiO_2$ to form magnetic dots having desired patterns. Further, sputtering is performed to form $SiO_2$ with a sufficient thickness. The $SiO_2$ is then etched back to the surface of the magnetic layer so as to fill the recesses with the nonmagnetic material ($SiO_2$) for flattening.

In the finishing step, abrasive finishing is performed to further increase the flatness of the surface. A DLC protective layer is then formed and a lubricant is applied to this layer. Thus, the bit patterned medium according to the embodiment of the present invention can be manufactured.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A magnetic disk apparatus comprising:

a magnetic disk comprising magnetic dot lines each including magnetic dots arrayed at equal intervals in a down track direction; and a read/write head which uses a plurality of adjacent magnetic dot lines as one track and sequentially performs read and write on the magnetic dots included in the magnetic dot lines constituting the track, wherein the magnetic dots included in each of the magnetic dot lines in each track of the magnetic disk are displaced in the down track direction from the magnetic dots included in the adjacent dot line in the track based on a skew angle between the read/write head and the track so that the magnetic dots in the plurality of magnetic dot lines in one track are accessed individually and sequentially by the read/write head in such a manner that one magnetic dot is used as one bit.

2. The magnetic disk apparatus according to claim 1, wherein the interval between the magnetic dot lines in each track is shorter than an interval between the tracks.

* * * * *